(12) United States Patent
Nahill et al.

(10) Patent No.: US 7,481,961 B2
(45) Date of Patent: Jan. 27, 2009

(54) MULTILAYER CONTAINER TRIMMING

(75) Inventors: Thomas E. Nahill, Amherst, NH (US);
David P. Piccioli, Auburn, NH (US)

(73) Assignee: Graham Packaging PET Technologies, Inc., York, PA (US)

( * ) Notice: Subject to any disclaimer, the term of this patent is extended or adjusted under 35 U.S.C. 154(b) by 722 days.

(21) Appl. No.: 10/816,499

(22) Filed: Apr. 1, 2004

(65) Prior Publication Data
US 2005/0218564 A1   Oct. 6, 2005

(51) Int. Cl.
*B29C 49/72* (2006.01)
*B29C 49/74* (2006.01)

(52) U.S. Cl. .................... 264/512; 264/138; 264/161
(58) Field of Classification Search .................. 264/512
See application file for complete search history.

(56) References Cited

U.S. PATENT DOCUMENTS

| | | |
|---|---|---|
| 3,469,076 A | 9/1969 | Saslawsky |
| 3,839,005 A | 10/1974 | Meyer |
| 4,305,904 A | 12/1981 | Black |
| 4,445,406 A | 5/1984 | Thatcher |
| 4,550,043 A | 10/1985 | Beck |
| 4,576,843 A | 3/1986 | Beck et al. |
| 4,865,533 A | 9/1989 | Hart et al. |
| 4,894,268 A | 1/1990 | Greenwood et al. |
| 5,617,768 A | 4/1997 | Palazzolo |
| 5,804,016 A | 9/1998 | Schmidt et al. |
| 6,228,317 B1 | 5/2001 | Smith et al. |
| 2002/0056346 A1 | 5/2002 | Marshall et al. |
| 2002/0079319 A1 | 6/2002 | Krieger et al. |

FOREIGN PATENT DOCUMENTS

| | | |
|---|---|---|
| EP | 0 392 571 A2 | 10/1990 |
| JP | 1079031 | 3/1989 |

OTHER PUBLICATIONS

International Search Report mailed Jul. 13, 2005 in corresponding application PCT/US2005/010617.

*Primary Examiner*—Monica A Huson
(74) *Attorney, Agent, or Firm*—Rissman Jobse Hendricks & Oliverio, LLP

(57) ABSTRACT

A method making a plastic container in accordance with one aspect of the present invention includes molding an intermediate container product having a body and a moil integral with the body. The body is of layered construction that includes at least one layer of barrier resin that extends part-way into but not throughout the moil. The upper portion of the moil, in which the barrier material is absent, is removed for recycling as process regrind. The lower portion of the moil is removed to form the container. In the preferred embodiment of the invention, the upper portion of the moil is removed in a laser trimming operation. The lower portion of the moil is removed in the preferred embodiment of the invention by inserting a plug into the open end or mouth of the container, and employing a cutting tool that is positioned by the plug for accurately trimming of the container product with respect to the mouth of the container. The cutting tool preferably is either a pair of shear rollers or a laser cutting tool.

28 Claims, 2 Drawing Sheets

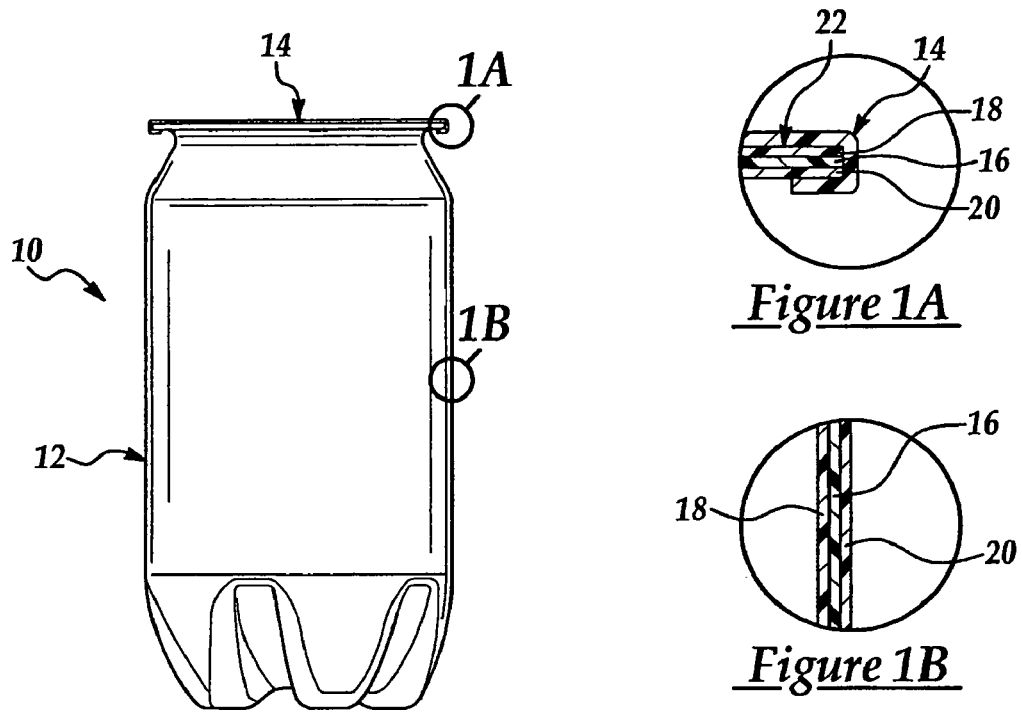
*Figure 1*
*Figure 1A*
*Figure 1B*
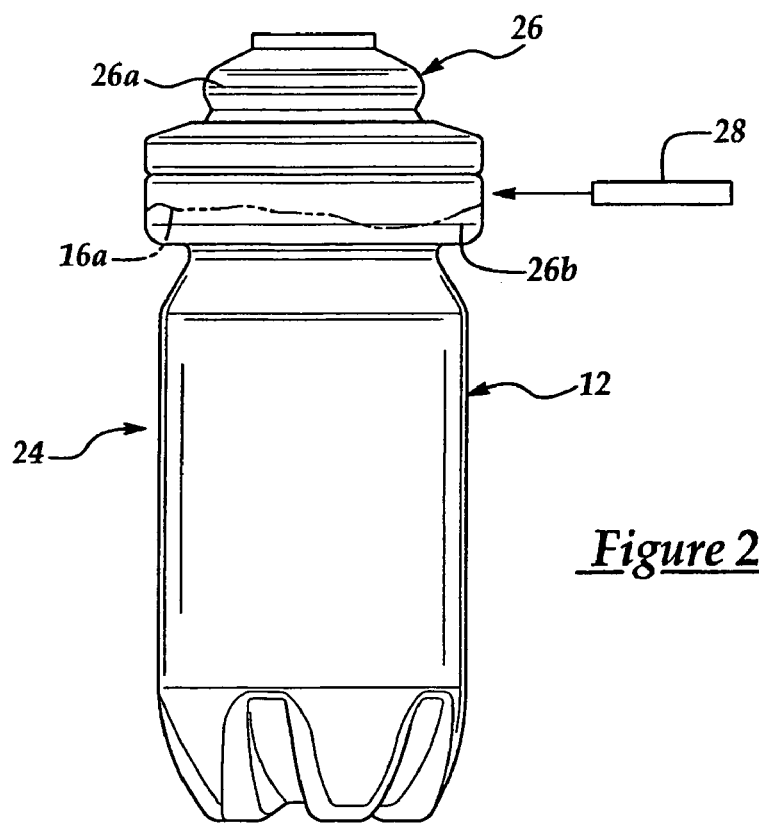
*Figure 2*

MULTILAYER CONTAINER TRIMMING

The present invention relates to fabrication of multilayer plastic containers, and more particularly to removal of a moil or dome from the container after blow molding.

BACKGROUND AND SUMMARY OF THE INVENTION

In the fabrication of certain types of containers, particularly wide-mouth containers, it is conventional practice to blow mold an intermediate container product from a preform, and then to remove the upper portion of the intermediate product, referred to as a dome or moil, in a post-molding operation. U.S. Pat. No. 4,576,843 discloses a container manufacturing method of this type, in which the moil is removed by knife blades carried by the blow mold sections. It has also been proposed to fabricate containers of the subject type having a multilayer or laminated sidewall that includes one or more intermediate layers of barrier resin such as ethylene vinyl alcohol (EVOH) or nylon. U.S. Pat. No. 4,550,043, for example, discloses a process for making a preform for such a container, in which the intermediate barrier layer can be controlled to extend only part-way through the preform and the intermediate container product.

Problems are encountered when making containers of this type. For example, it is difficult to control placement of the edge of the intermediate barrier layer exactly at the moil trim line, so that the barrier layer must be made to extend into the moil to ensure that the barrier layer extends throughout the final container product. This, however, compromises the ability to use the trimmed moil as process regrind inasmuch as it is undesirable to have barrier material in the process regrind. Furthermore, the use of knife blades to trim a multilayer container product is undesirable because the blade can cause delamination at the trim line, and because the knife blade is subject to excessive wear when used in combination with abrasive container layer materials such as polyethylene terephthalate (PET). U.S. Pat. No. 4,549,066 discloses the use of a laser for performing the trimming operation, which reduces the delamination and wear problems.

A method making a plastic container in accordance with one aspect of the present invention includes molding an intermediate container product having a body and a moil integral with the body. The body is of layered construction that includes at least one layer of barrier resin that extends partway into but not throughout the moil. The upper portion of the moil, in which the barrier material is absent, is removed for recycling as process regrind. The lower portion of the moil is removed to form the container. In the preferred embodiment of the invention, the upper portion of the moil is removed in a laser trimming operation. The lower portion of the moil is removed in the preferred embodiment of the invention by inserting a plug into the open end or mouth of the container, and employing a cutting tool that is positioned by the plug for accurately trimming the container product with respect to the mouth of the container. The cutting tool preferably is either a pair of shear rollers or a laser cutting tool.

BRIEF DESCRIPTION OF THE DRAWINGS

The invention, together with additional objects, features, advantages and aspects thereof, will be best understood from the following description, the appended claims and the accompanying drawings, in which:

FIG. 1 is a side elevational view of a plastic container with lid in accordance with one exemplary embodiment of the invention;

FIGS. 1A and 1B are fragmentary sectional views of the portions of FIG. 1 within the respective areas 1A and 1B;

FIG. 2 is a schematic diagram that illustrates a container intermediate product being subjected to a first trimming operation in accordance with the exemplary embodiment of the invention;

DETAILED DESCRIPTION OF PREFERRED EMBODIMENTS

Figure 3:
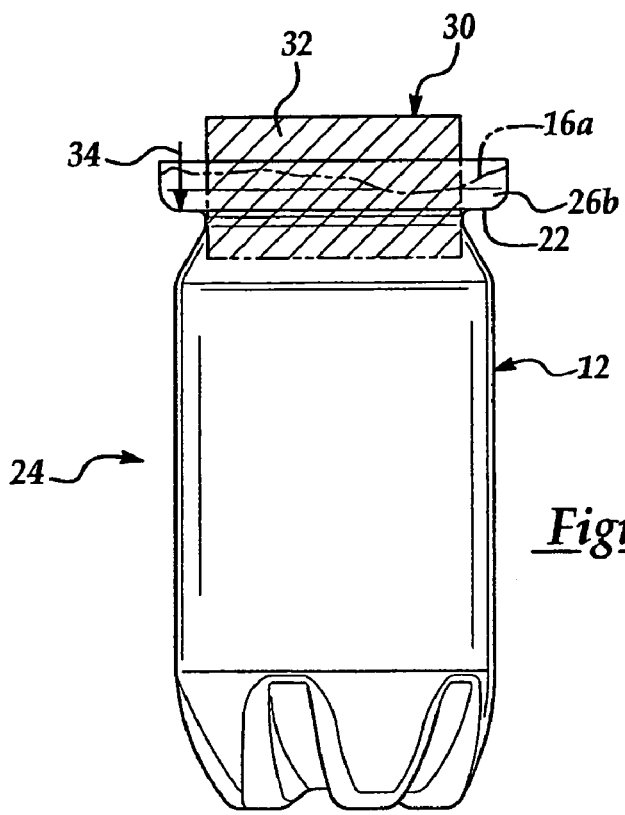
FIG. 3 is a schematic diagram that illustrates the container intermediate product being subjected to a second trimming operation in accordance with the exemplary embodiment of the invention.

FIG. 1 illustrates a package 10 in accordance with one exemplary embodiment of the invention as including a container 12 to which a lid 14 is secured. Container 12 is of multilayer construction, having at least one outer or structural layer and at least one intermediate layer of barrier resin material. In the specific three-layer embodiment illustrated in FIGS. 1A and 1B, the container has an intermediate layer 16 sandwiched between inner and outer layers 18, 20. Layers 18, 20 may be of PET construction, for example, and intermediate layer 16 may be of barrier resin such as EVOH or nylon. Another exemplary construction would be a five-layer construction in the form PET/barrier/PET/barrier/PET. Barrier layer 16 extends throughout the body of container 12 to the edge of a flange 22 that projects radially outwardly from the open mouth of the container. Lid 14 may be of suitable metal construction, and may be crimped over flange 22 in a double-seam crimp configuration.

Container 12 is formed from a blow molded intermediate container product 24 (FIG. 2) that includes the body of container 12 and an integrally molded dome or moil 26. Container intermediate product 24 may be fabricated by first injection or compression molding a container preform and then blow molding the preform. Intermediate barrier layer(s) 16 preferably do not extend entirely through the preform, so that the upper edge 16a of intermediate layer 16 is disposed within the lower portion 26b of moil 26. After blow molding, the upper portion 26a of moil 26 is removed or trimmed from the rest of container intermediate product 24 by use of a first trimmer 28, preferably a laser trimmer. Laser trimmer 28 is positioned to trim upper portion 26a of moil 26 just above the upper edge 16a of the barrier layer. The position of laser trimming preferably is set empirically based upon the maximum extent of the barrier layer into the moil. (It will be appreciated that words such as "upper" and "lower" are employed by way of description and not limitation with respect to the upright orientation of the container and container intermediate product illustrated in the drawings.) The upper portion 26a of moil 26 so removed by laser trimmer 28 can thus be recycled as process regrind for formation of layers 18, 20.

Figure 4:
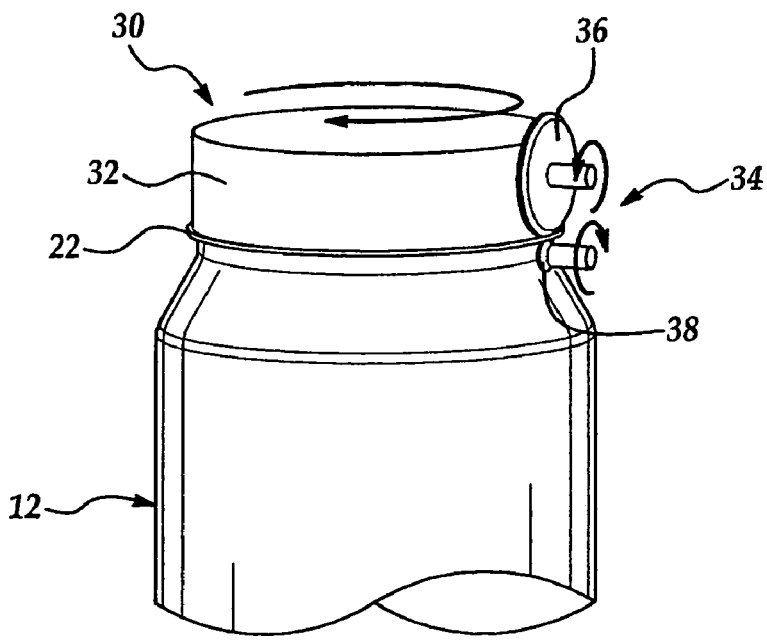
FIG. 4 is a fragmentary perspective schematic view of the trimming operation illustrated in FIG. 3.

The container intermediate product 24 is then subjected to a second trimming operation, which is illustrated schematically in FIGS. 3 and 4. A trimming tool 30 includes a plug 32 sized for insertion into the open mouth of container intermediate product 24 after upper moil portion 26a has been removed. A cutter 34 is positioned by means of the plug, such as by being physically coupled to the plug, to engage the flange 22 of container 12. In one presently preferred embodiment of the invention illustrated schematically in FIG. 4, cutter 34 comprises a pair of shear rollers 36, 38 sized to engage and trim the upper and lower edges of flange 22 respectively. Thus, the radially outer edge of flange 22 is trimmed on a circle that is accurately located with respect to the axis of plug 32, and thus with respect to the open mouth of container 12 into which plug 32 is received. The lower portion 26b of moil 26 is thus removed in this second trimming operation. As a modification to the preferred embodiment illustrated in FIGS. 3 and 4, shear rollers 36, 38 can be replaced by a laser trimmer that is either mounted on plug 32, or is mounted on separate support structure for engaging and thus being accurately positioned with respect to plug 32. Moil lower portion 26b removed by cutter 30 may be scrapped, or may be used as process regrind in non-food applications.

There have thus been disclosed a method of making a plastic container, and a resulting container, that fully embody all of the objects and features discussed above. The invention has been disclosed in conjunction with an exemplary presently preferred embodiment thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

The invention claimed is:

1. A method of making a plastic container, which includes the steps of:
   (a) molding an intermediate plastic container product having a body and a moil integral with the body, the body being layered and including at least one layer of barrier material that extends part-way into but not throughout the moil;
   (b) removing an upper portion of the moil in which the barrier material is absent; and
   (c) removing, from the remaining moil integral with the body, a lower portion of the moil in which the barrier material is present, to form the container.

2. The method of claim 1, wherein the upper moil portion is removed with a laser.

3. The method of claim 1, wherein a plug is inserted into an open mouth of the container product after removal of the upper moil portion.

4. The method of claim 3, wherein a tool is positioned with respect to the plug for removing the lower moil portion.

5. The method of claim 4, wherein the tool comprises shear rollers or a laser.

6. The method of claim 1, wherein the removal of the upper moil portion maximizes the extent of the barrier layer in the lower moil portion.

7. The method of claim 1, wherein following removal of the upper and lower moil portions there is provided a radially outwardly extending flange at an open mouth of the container.

8. The method of claim 7, including securing a lid to the flange.

9. The method of claim 8, wherein the securing is by double-seam crimping of the lid to the flange.

10. The method of claim 7, wherein a radial outer edge of the flange is trimmed.

11. The method of claim 10, wherein the outer edge of the flange is cut on a circle located with respect to an axis of the open mouth of the container.

12. The method of claim 7, wherein a plug is inserted into an open end of the container product after removal of the upper moil portion, and the flange is trimmed on a circle located with respect to an axis of the plug and open end of the container product.

13. The method of claim 7, wherein the barrier layer extends to a radially outer edge of the flange.

14. The method of claim 1, wherein the upper moil portion is recycled.

15. The method of claim 1, wherein the lower moil portion is processed as regrind.

16. The method of claim 1, wherein the layers include at least one layer of polyethylene teraphthalate (PET).

17. The method of claim 16, wherein the layers include inner and outer layers of PET.

18. The method of claim 16, wherein the barrier material is EVOH or nylon.

19. The method of claim 16, wherein the layers include the barrier layer between inner and outer layers of PET.

20. The method of claim 16, wherein the layers include five layers in the form PET/barrier/PET/barrier/PET.

21. A method of making a plastic container, which includes the steps of:
   (a) blow molding an intermediate container product having a body and a moil integral with the body, the body being layered and including at least one intermediate layer of barrier material that extends part-way into but not throughout the moil,
   (b) removing an upper portion of the moil, in which the barrier material is absent, in a laser cutting operation, and
   (c) removing, from the remaining moil integral with the body, a lower portion of the moil, in which the barrier material is present, to form the container, wherein step (c) includes inserting a plug into an open end of the container and severing the lower portion of the moil with a cutting tool positioned by the plug.

22. The method of claim 21, wherein the cutting tool comprises shear rollers or a laser.

23. The method of claim 21, wherein the removal of the upper moil portion maximizes the extent of the barrier layer in the lower moil portion.

24. The method of claim 21, wherein following removal of the upper and lower moil portions there is provided a radially outwardly extending flange at an open mouth of the container.

25. The method of claim 24, including securing a lid to the flange.

26. The method of claim 24, wherein a radial outer edge of the flange is trimmed.

27. The method of claim 26, wherein the outer edge of the flange is cut on a circle located with respect to an axis of the open mouth of the container.

28. The method of claim 24, wherein the barrier layer extends to a radially outer edge of the flange.

* * * * *